United States Patent
Kim

(10) Patent No.: US 9,916,038 B2
(45) Date of Patent: Mar. 13, 2018

(54) TOUCH SENSOR

(71) Applicant: Dongbu HiTek Co., Ltd., Bucheon-si (KR)

(72) Inventor: Hak Soo Kim, Cheongju-si (KR)

(73) Assignee: Dongbu HiTek Co. Ltd., Bucheon-si (KR)

( * ) Notice: Subject to any disclaimer, the term of this patent is extended or adjusted under 35 U.S.C. 154(b) by 144 days.

(21) Appl. No.: 14/946,501

(22) Filed: Nov. 19, 2015

(65) Prior Publication Data

US 2016/0266716 A1    Sep. 15, 2016

(30) Foreign Application Priority Data

Mar. 9, 2015 (KR) .................. 10-2015-0032617

(51) Int. Cl.
  *G06F 3/14* (2006.01)
  *G06F 3/041* (2006.01)
(52) U.S. Cl.
  CPC .................. *G06F 3/0418* (2013.01)

(58) Field of Classification Search
  CPC combination set(s) only.
  See application file for complete search history.

(56) References Cited

U.S. PATENT DOCUMENTS

| | | | |
|---|---|---|---|
| 2007/0009269 A1* | 1/2007 | Zitelli | H04B 10/505 398/188 |
| 2011/0150484 A1* | 6/2011 | Wang | H04B 10/2537 398/115 |
| 2014/0160071 A1* | 6/2014 | Reynolds | G06F 3/041 345/174 |

* cited by examiner

*Primary Examiner* — Van N Chow
(74) *Attorney, Agent, or Firm* — Andrew D. Fortney; Central California IP Group, P.C.

(57) ABSTRACT

A touch sensor includes a touch panel including driving lines and sensing lines and having node capacitors between neighboring or overlapping driving lines and sensing lines, a driving unit configured to modulate driving signals using a direct sequence spread spectrum technique or scheme and simultaneously drive two or more of the driving lines using the modulated driving signals, and a sensing unit configured to demodulate the signals from the sensing lines using the direct sequence spread spectrum method and generate demodulated signals.

16 Claims, 6 Drawing Sheets

(a)

(b)

(a)

(b)

TOUCH SENSOR

This application claims the benefit of Korean Patent Application No. 10-2015-0032617, filed on Mar. 9, 2015, which is hereby incorporated by reference as if fully set forth herein.

BACKGROUND OF THE INVENTION

Field of the Invention

Embodiments relate to a touch sensor.

Discussion of the Related Art

In a general method of driving a capacitive touch sensor, driving signals are sequentially sent to driving lines and are subjected to time division processing. This method is a time-division single-line driving method and is easily implemented because demodulation is not required. However, since there is a restriction on the response time, it is difficult to obtain a large number of samples for a 1-line driving signal. In addition, in low-frequency noise environments and large-panel applications, it is difficult to ensure an adequate accumulation processing time for noise filtering.

Methods of driving a touch sensor also include a multi-line driving method, which is a parallel method of simultaneously sending driving signals to a plurality of driving lines. The multi-line driving method refers to a method that can use a signal polarity at the same timing instead of time division processing. The multi-line driving method can ensure a large number of samples as compared to time division processing, and has excellent noise filtering performance. In contrast, the multi-line driving method requires a demodulation circuit for gathering data from the driving lines and may increase complexity and area. In addition, in some multi-line driving methods, since a regular pattern using two different polarities is used, there may be restrictions on creation of large types of patterns within a predetermined response time.

SUMMARY OF THE INVENTION

Accordingly, embodiments are directed to a touch sensor capable of improving noise immunity and accuracy.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure(s) particularly pointed out in the written description and claims hereof as well as the appended drawings.

To achieve these objects and other advantages and in accordance with the purpose(s) of the embodiments, as embodied and broadly described herein, a touch sensor may include a touch panel including driving lines and sensing lines and having node capacitors formed between neighboring driving lines and sensing lines or from overlapping driving lines and sensing lines, a driving unit configured to modulate driving signals using a direct sequence spread spectrum technique or scheme and simultaneously drive two or more of the driving lines using the modulated driving signals, and a sensing unit configured to demodulate the signals from the sensing lines using the direct sequence spread spectrum technique or scheme to generate demodulated signals.

The driving unit may multiply the driving signals by first pseudo-random binary sequences and modulate the first pseudo-randomly multiplied driving signals.

The first pseudo-random binary sequences may have different values.

A period of the first pseudo-random binary sequences may be shorter than that of the driving signals, and a probability of each of the first pseudo-random binary sequences may be 1 during a driving sample period of the two or more driving lines.

The sensing unit may multiply the signals received by the sensing lines by second pseudo-random binary sequences and demodulate the second pseudo-randomly multiplied signals, and each of the second pseudo-random binary sequences may be identical to any one of the first pseudo-random binary sequences.

The sensing unit may include an amplifier unit configured to amplify the (analog) signals received by the sensing lines to output amplified signals, an analog/digital converter unit configured to convert the amplified (analog) signals to digital signals, and a demodulator unit configured to demodulate the digital signals using the direct sequence spread spectrum technique or scheme to generate the demodulated signals.

The sensing unit may further include an integrator unit configured to integrate the demodulated signals and generate integrated signals.

The demodulator unit may include a plurality of demodulators, where each of the plurality of modulators may multiply each digital signal by any one of the second pseudo-random binary sequences and generate the demodulated signal, and each of the second pseudo-random binary sequences may be identical to any one of the first pseudo-random binary sequences.

The sensing unit may further include a first calculator unit configured to calculate a difference between each of the integrated signals and a reference digital signal to generate digital output signals (e.g., digital difference signals), and the reference digital signal may be obtained by converting a reference voltage (e.g., an analog reference voltage) to a digital voltage, and multiplying the digital voltage by a reference gain, and the reference gain may be a gain of the amplifier unit when the touch panel is not touched.

The sensing unit may further include a digital signal processor configured to detect a change in the capacitances of the sensing nodes (e.g., by processing the integrated signals).

The driving unit may include driving circuits configured to drive the driving lines, and each of the driving circuits may include a random number generator configured to generate a first pseudo-random sequence and a modulator configured to multiply a driving signal by the first pseudo-random binary sequence and output a modulated driving signal.

The amplifier unit may include an operational amplifier including a first input terminal connected to any one of the sensing lines, a second input terminal connected to ground and an output terminal configured to output the amplified signal(s), and a feedback capacitor connected between the output terminal and the first input terminal of the operational amplifier.

According to another embodiment, a touch sensor may include a touch panel including driving lines and sensing lines and having node capacitors formed between neighboring driving lines and sensing lines or from overlapping driving lines and sensing lines, the driving lines including a plurality of groups, each of the plurality of groups including two or more of the driving lines, a driving unit configured to modulate driving signals using a direct sequence spread spectrum technique or scheme and simultaneously drive two or more of the driving lines in each of the plurality of groups using the modulated driving signals, and a sensing unit configured to generate amplified signals by amplifying the signals on or from the sensing lines, generate digital signals from (e.g., by converting) the amplified signals, generate demodulated signals by demodulating the digital signals using the direct sequence spread spectrum technique or scheme, and generate integrated signals by integrating the demodulated signals.

The driving unit may multiply each of the driving signals by any one of different first pseudo-random binary sequences to generate the modulated driving signals.

The sensing unit may calculate a difference between each of the integrated signals and a reference digital signal and generate digital output signals (e.g., digital difference signals). The reference digital signal may be obtained by converting a reference voltage and multiplying the converted reference voltage by a reference gain, and the reference gain may be gain of the amplified signal when the touch panel is not touched.

The driving unit may sequentially drive the plurality of groups.

It is to be understood that both the foregoing general description and the following detailed description of various embodiments are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle(s) of the invention. In the drawings.

DETAILED DESCRIPTION OF THE INVENTION

Figure 1:
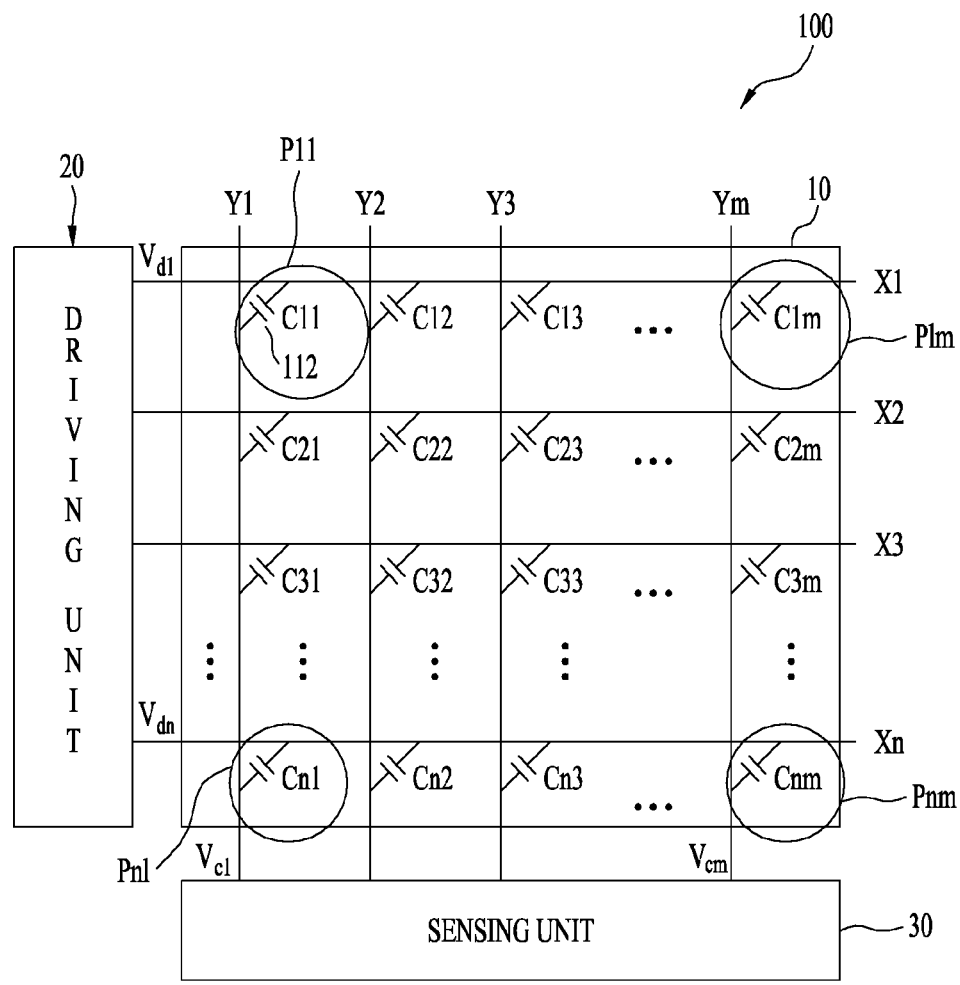
FIG. 1 is a block diagram showing an exemplary touch sensor according to an embodiment.

Hereinafter, exemplary embodiments of the invention will be clearly appreciated through the accompanying drawings and the following description thereof. In the description of the various embodiments, it will be understood that, when an element such as a layer, film, region, pattern or structure is referred to as being formed "on" or "under" another element, such as a substrate, layer, film, region, pad or pattern, it can be directly "on" or "under" the other element, or indirectly "on" or "under" the other element with intervening elements therebetween. It will also be understood that "on" and "under" the element are described relative to the drawings.

In the drawings, the size of each layer may be exaggerated, omitted or schematically illustrated for clarity and convenience. In addition, the size of each constituent element may not wholly reflect an actual or proportional size thereof. In addition, the same reference numerals designate the same constituent elements throughout the description of the drawings.

FIG. 1 is a block diagram showing an exemplary touch sensor 100 according to an embodiment.

Referring to FIG. 1, the touch sensor 100 includes a touch panel 10, a driving unit 20 and a sensing unit 30.

The touch panel 10 substantially performs an independent function and provides a plurality of sensing nodes P11 to Pnm (n and m being natural numbers greater than 1) located at different positions.

The sensing nodes P11 to Pnm (n and m being natural numbers greater than 1) may also be referred to as coordinates, sensing points, or nodes, or cumulatively as a sensing node array.

For example, the touch panel 10 may include a plurality of driving lines X1 to Xn (n being a natural number greater than 1), a plurality of sensing lines Y1 to Ym (m being a natural number greater than 1), and node capacitors C11 to Cnm (n and m being natural numbers greater than 1) formed between neighboring or overlapping driving and sensing lines. Here, the node capacitor may also be referred to as a mutual capacitor.

The driving lines X1 to Xn (n being a natural number greater than 1) may also be referred to as driving signal lines or driving electrodes.

In addition, the sensing lines Y1 to Ym (m being a natural number greater than 1) may also be referred to as sensing signal lines or sensing electrodes.

Although the driving lines and the sensing lines are shown as crossing each other in FIG. 1, embodiments are not limited thereto and the driving lines and the sensing lines may not cross each other.

Any one sensing node (e.g., P11) may be defined by any one node capacitor (e.g., C11) formed between any one driving line (e.g., X1) and any one sensing line (e.g., Y1).

For example, the driving line Xi (i being a natural number, $0<i\leq n$) and the sensing line Yj (j being a natural number, $0<j\leq m$) are insulated from each other, and the node capacitor Cij may be formed between the driving line Xi (i being a natural number, $0<i\leq n$) and the sensing line Yj (j being a natural number, $0<j\leq m$).

For example, the touch panel 10 may include an electrode pattern layer (not shown) including the sensing and driving electrodes spaced apart from each other, a substrate (not shown) on one side (e.g., in front) of the electrode pattern layer and an insulating layer (not shown) on an opposite side of (e.g., behind) the electrode pattern layer. The layout of the electrode pattern layer may have various shapes according to various design methods.

The electrode pattern layer may include at least one of indium tin oxide (ITO), tin oxide (TO), indium zinc oxide (IZO), indium tin zinc oxide (ITZO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), carbon nanotubes (CNT), a conductive polymer, silver, copper and materials formed from a transparent ink, for example.

The electrode pattern layer is coated on one or more layers comprising a glass or plastic to form the sensing arrays P11 to Pnm (n and m being natural numbers greater than 1).

The substrate may be a dielectric film having high light transmittance and may include at least one of glass, polyethylene terephthalate (PET), polyethylene naphthalate (PEN), polyimide (PI) or a poly(meth)acrylate, for example.

The insulating layer may be a transparent insulating layer such as a PET layer. In another embodiment, a shield layer (not shown) may be located under the insulating layer to prevent electromagnetic interference (EMI) and noise from flowing into the electrode pattern layer.

The touch panel 10 may be merged with a layer for displaying information (e.g., an electrochromic material) according to display panel designs and/or methods, and the layer for displaying information may share paths for driving or sensing with the touch panel. The touch panel that is not merged with the display may have a two-dimensional sensing node array configured using an appropriate method, and the exemplary embodiment is applicable to a touch sensing system including a two-dimensional sensing node array.

The driving unit 20 may be electrically connected to the plurality of driving lines X1 to Xn (n being a natural number greater than 1) and provide driving signals Vd1 to Vdn (n being a natural number greater than 1) to the driving lines X1 to Xn (n being a natural number greater than 1).

The driving unit 20 may simultaneously provide driving signals Vd1 to Vdk (k being a natural number, 1<k<n) to the two or more driving lines (e.g., X1 to Xk) (k being a natural number, 1<k<n) of the plurality of driving lines X1 to Xn (n being a natural number greater than 1).

For example, the plurality of driving lines X1 to Xn (n being a natural number greater than 1) may include a plurality of groups, and each of the plurality of groups may include two or more driving lines. The driving unit 20 sequentially drives the plurality of groups, and two or more driving lines included in each of the plurality of groups may be simultaneously driven. Different groups may not include the same driving line.

Here, the term "simultaneously" may encompass not only "substantially simultaneously" but also "precisely simultaneously." For example, simultaneously performed operations may mean that operations substantially simultaneously start and substantially simultaneously finish and/or that the time periods of operation at least partially overlap each other.

Figure 2:
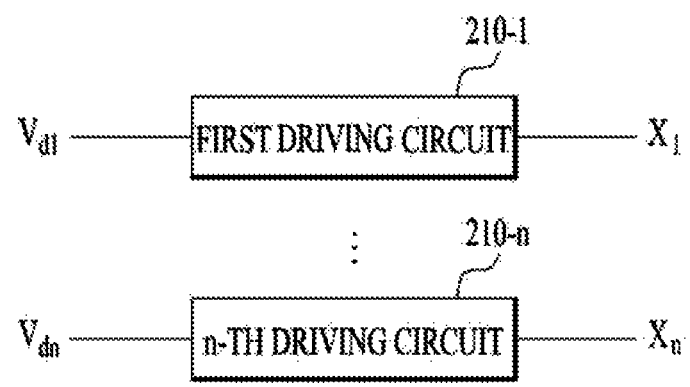
FIG. 2 is a diagram showing an exemplary embodiment of the driving unit shown in FIG. 1.

FIG. 2 is a diagram showing one embodiment of the driving unit 20 shown in FIG. 1.

Referring to FIG. 2, the driving unit 20 may include driving circuits 210-1 to 210-n (n being a natural number greater than 1) configured to provide the driving signals Vd1 to Vdn (n being a natural number greater than 1) to the plurality of driving lines X1 to Xn (n being a natural number greater than 1).

For example, the driving circuits 210-1 to 210-n (n being a natural number greater than 1) may include a plurality of groups to correspond to the groups of the driving lines.

The driving circuits belonging to each group may simultaneously drive two or more driving lines corresponding to each group.

Referring back to FIG. 1, the sensing unit 30 may be electrically connected to the plurality of sensing lines Y1 to Ym (m being a natural number greater than 1) and may sense the capacitance of the node capacitor between the driving line to which the driving signal is applied and the sensing line corresponding thereto.

Figure 3:
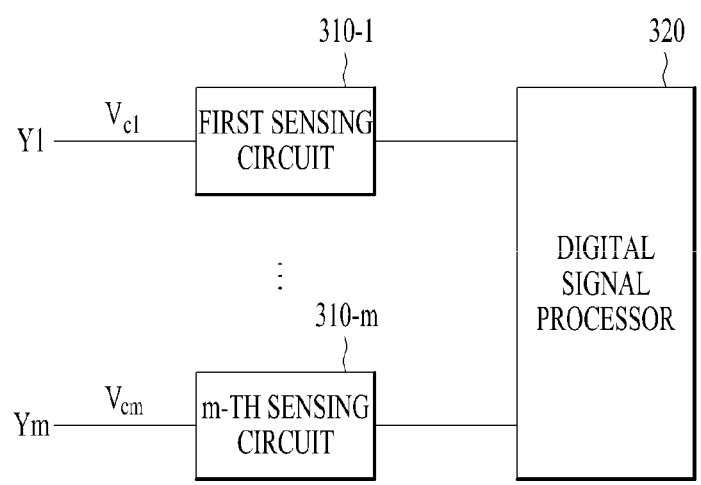
FIG. 3 is a block diagram showing an exemplary embodiment of the sensing unit shown in FIG. 1.

FIG. 3 is a block diagram showing one embodiment of the sensing unit 30 shown in FIG. 1.

Referring to FIG. 3, the sensing unit 30 includes first to m-th sensing circuits 310-1 to 310-m (m being a natural number greater than 1) and a digital signal processor 320.

Each of the first to m-th sensing circuits 310-1 to 310-m (m being a natural number greater than 1) may be connected to any one of the plurality of sensing lines Y1 to Ym (m being a natural number greater than 1) and may sense a signal received via any one sensing line corresponding thereto.

The digital signal processor 320 detects the change in capacitance of the sensing nodes P11 to Pnm (n and m natural numbers greater than 1) based on the results sensed by and/or the signals from the first to m-th sensing circuits 310-1 to 310-m (m being a natural number greater than 1).

The digital signal processor 320 may perform a variety of digital signal processing functions (e.g., filtering, comparison, amplification, noise cancellation, signal detection, etc.) with respect to digital data output from the first to m-th sensing circuits 310-1 to 310-m (m being a natural number greater than 1) and detect changes in mutual capacitance of the sensing nodes P11 to Pnm (n and m being natural numbers greater than 1).

Figure 4A:
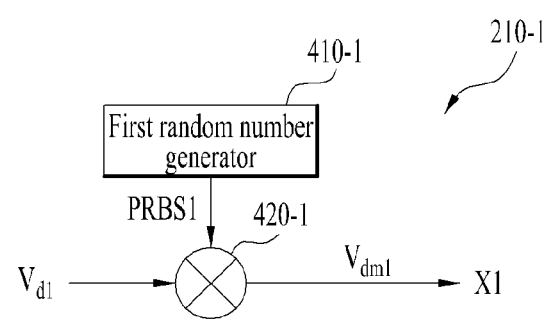
FIG. 4A is a diagram showing an exemplary embodiment of the first driving circuit shown in FIG. 2.

FIG. 4A is a diagram showing one embodiment of a first driving circuit 210-1 shown in FIG. 2.

The configurations of the driving circuits 210-1 to 210-n (n being a natural number greater than 1) shown in FIG. 2 may be identical. Thus, only the configuration of the first driving circuit 210-1 will be described, and a description of the other driving circuits will be omitted in order to avoid redundancy.

Referring to FIG. 4A, the first driving circuit 210-1 modulates the driving signal Vd1 using a direct sequence spread spectrum technique or scheme and outputs a modulated first driving signal Vdm1.

For example, the first driving circuit 210-1 may multiply the first driving signal Vd1 by a first pseudo-random binary sequence PRBS1 and output the modulated first driving signal Vdm1, in accordance with the multiplication operation. The period of the first pseudo-random binary sequence PRSB1 may be shorter than that of the first driving signal Vd1, and the probability of the first pseudo-random binary sequence PRSB1 may be 1 during a driving sample period of the driving line. Here, the driving sample period may mean a period of time when the sensing unit 30 receives the signals from the sensing lines of the touch panel 10, for sensing.

The first driving circuit 210-1 may include a random number generator 410 and a modulator 420. The random number generator 410 may generate the first pseudo-random binary sequence PRBS1. The modulator 420 may multiply the first driving signal Vd1 by the first pseudo-random binary sequence PRBS1 and output the modulated first driving signal Vdm1 in accordance with the result of the multiplication operation.

Figure 4B:
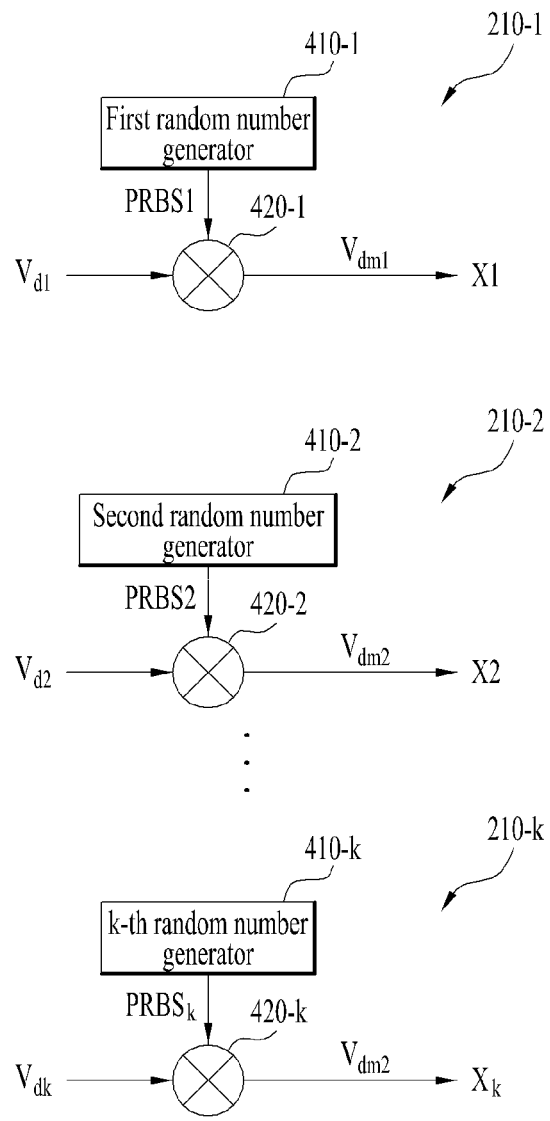
FIG. 4B is a diagram showing exemplary simultaneously driven first to k-th driving circuits.

FIG. 4B is a diagram showing simultaneously driven first to k-th driving circuits 210-1 to 210-k.

Referring to FIG. 4B, the driving signals Vd1 to Vk (k being a natural number, 1<k<n) may be simultaneously provided to the first to k-th modulators 410-1 to 420-k (k being a natural number, 1<k<n), respectively. The driving signals Vd1 to Vk (k being a natural number, 1<k<n) may be identical, without being limited thereto.

The first to k-th modulators 420-1 to 420-k (k being a natural number, 1<k<n) may output modulated first to k-th driving signals Vdm1 to Vdmk (k being a natural number, 1<k<n), in accordance with multiplying the driving signals Vd1 to Vk (k being a natural number, 1<k<n) by the first pseudo-random sequences PRBS1 to PRBSk (k being a natural number, 1<k<n) received from the first to k-th random number generators 410-1 to 410-k (k being a natural number, 1<k<n).

The first pseudo-random sequences PRBS1 to PRBSk (k being a natural number, 1<k<n) from the first to k-th random number generators 410-1 to 410-k (k being a natural number, 1<k<n) to the first to k-th modulators 420-1 to 420-k (k being a natural number, 1<k<n) may have different values. Accordingly, the modulated first to k-th driving signals Vdm1 to Vdmk (k being a natural number, 1<k<n) may be different from each other.

Figure 5:
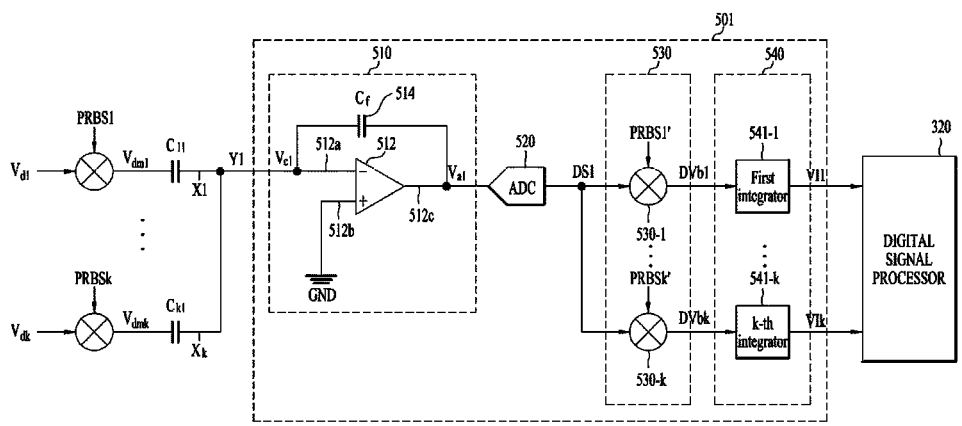
FIG. 5 is a diagram showing an exemplary embodiment of the first sensing circuit shown in FIG. 3.

FIG. 5 is a diagram showing one embodiment 501 of the first sensing circuit 310-1 shown in FIG. 3.

The configurations of the sensing circuits 310-1 to 310-m (m being a natural number greater than 1) shown in FIG. 3 may be identical. Thus, only the configuration of the first sensing circuit 310-1 will be described, and a description of the other sensing circuits will be omitted in order to avoid redundancy.

Referring to FIG. 5, the first sensing circuit 501 may amplify a signal Vc1 received via a first sensing line Y1, and convert the amplified analog signal Va1 to a digital signal DS1. In addition, the first sensing circuit 501 may generate demodulated signals DVb1 to DVbk (k being a natural number, 1<k<n) corresponding to the simultaneously driven driving lines X1 to Xkm (k being a natural number, 1<k<n) using a direct sequence spread spectrum technique or scheme, integrate the demodulated signals DVb1 to DVbk (k being a natural number, 1<k<n), and generate integrated signals VI1 to VIk (k being a natural number, 1<k<n) in accordance with the integration operation.

The digital signal processor 320 may digitally process the integrated signals VI1 to VIk (k being a natural number, 1<k<n) and detect changes in the capacitance of the sensing nodes P11 to Pnm (n and m being natural numbers greater than 1) in accordance with the digital processing.

The first sensing circuit 501 may include an amplifier unit 510, an analog/digital converter unit 520, a demodulator unit 530 and an integrator unit 540.

The amplifier unit 510 amplifies the signal Vc1 on the first sensing line Y1 and outputs an amplified signal Va1.

The amplifier unit 510 may include an amplifier 512 and a feedback capacitor 514.

The amplifier 512 may include a first input terminal 512a (e.g., a negative (−) input terminal) connected to any one (e.g., Y1) of the sensing lines Y1 to Ym, a second input terminal 512b (e.g., a positive (+) input terminal) connected to a ground potential GND, and an output terminal 512c configured to output the amplified signal Va1.

The amplifier 512 may comprise a differential amplifier configured to differentially amplify a first signal Vc1 input to the first input terminal 512a and (optionally) the ground potential GND input to the second input terminal 512b. The amplifier 512 may be implemented as an operational amplifier, such as a field effect transistor (FET) or a bipolar junction transistor (BJT), without being limited thereto.

The feedback capacitor 514 may be connected between the output terminal 512c and the first input terminal 512a of the amplifier 512.

The feedback capacitor 514 may provide or be responsible for negative feedback from the output signal Va1 of the amplifier 512 to the first input terminal 512a.

Although not shown in FIG. 5, in another embodiment, the amplifier unit 510 may further include a feedback resistor (not shown) connected between the output terminal 512c and the first input terminal 512a of the amplifier 512. For example, the feedback resistor and the feedback capacitor 514 may be connected between the output terminal 512c and the first input terminal 512a of the amplifier 512 in parallel.

The analog/digital converter unit 520 converts the analog amplified signal Va1 and outputs the digital signal DS1 in accordance with the conversion operation.

The demodulator unit 530 demodulates the digital signal DS1 using a direct sequence spread spectrum technique or scheme and generates demodulated signals DVb1 to DVBk (k being a natural number, 1<k<n) corresponding to the simultaneously driven driving lines X1 to Xkm (k being a natural number, 1<k<n).

For example, the demodulator unit 530 may include a plurality of demodulators 530-1 to 530-k (k being a natural number, 1<k<n). Each of the plurality of demodulators 530-1 to 530-k (k being a natural number, 1<k<n) may multiply any one of second pseudo-random binary sequences PRBS1' to PRBSk' (k being a natural number, 1<k<n) by the digital signal DS1 and output the demodulated signals DVb1 to DVbk (k being a natural number, 1<k<n) in accordance with the result of the multiplication operation.

The second pseudo-random binary sequences PRBS1' to PRBSk' (k being a natural number, 1<k<n) may be identical to the first pseudo-random binary sequences PRBS1 to PRBSk (k being a natural number, 1<k<n).

The first pseudo-random binary sequence for modulation of the driving signals provided to the simultaneously driven driving lines X1 to Xkm (k being a natural number, 1<k<n) and the second pseudo-random binary sequence for demodulation may be identical. For example, the second pseudo-random binary sequence (e.g., PRBS1') may be identical to the first pseudo-random binary sequence (e.g., PRBS1) corresponding thereto in terms of level, period and synchronization. Likewise, the second pseudo-random binary sequences PRBS2' through PRBSk' may be identical to the first pseudo-random binary sequences PRBS2 through PRBSk, respectively.

The integrator unit 540 may include a plurality of integrators 541-1 to 541-k (k being a natural number greater than 1). Each of the plurality of integrators 541-1 to 541-k (k being a natural number greater than 1) may integrate any one of the demodulated signals DVb1 to DVbk (k being a natural number, 1<k<n) from the plurality of demodulators 530-1 to 530-k (k being a natural number, 1<k<n) and output integrated signals VI1 to VIk (k being a natural number, 1<k<n) in accordance with the integration operation.

When the demodulated signals DVb1 to DVbk (k being a natural number, 1<k<n) are integrated by the integrator unit 540, parts or components of the demodulated signals DVb1 to DVbk corresponding to the driving signals Vd1 to Vdk (k being a natural number, 1<k<n) to which the direct sequence spread spectrum technique or scheme has been applied in a relatively low frequency band may be added, and parts or components of the demodulated signals DVb1 to DVbk corresponding to noise in a relatively high frequency band may be eliminated. That is, the integrator unit 540 may serve as a low pass filter.

Since the driving signals Vd1 to Vdk (k being a natural number, 1<k<n) for simultaneously driving two or more driving lines X1 to Xk (k being a natural number, 1<k<n) are modulated using pseudo-random binary sequences having different values, the modulated driving signals Vdm1 to Vdmk (k being a natural number, 1<k<n) may not reflect, incorporate, or be correlated with or affected by environmental noise and irregular and random properties. For example, the pseudo-random binary sequences having different values may be close to white noise in the frequency domain.

Since the probability of the first pseudo-random binary sequence PRSB1 is 1 during the driving sample period of the driving line, a modulated driving signal having the same power as that of the driving signal may be provided to the driving line.

In one embodiment, the absolute value of mutual capacitance may be expressed by a digital value, and the properties of the touch panel may be profiled in advance, such that digital calibration of the mutual capacitance of the sensing nodes is possible. In addition, failures, such as short-circuits, of the sensing lines in the touch panel may be detected.

Compared with one or more conventional multi-line driving methods, since modulated driving signals based on statistics and/or generated with the pseudo-random binary sequences are used, the format (e.g., of the modulated driving signals and/or the pseudo-random binary sequences) need not be specific, and thus, there is no restriction on various implementations of the present invention.

Due to diversity of the signal patterns of the driving signals for simultaneously driving two or more driving lines, embodiments of the invention can obtain high signal resolution within a given response time, as compared to general multi-line driving methods using grouping. Such resolution may be further improved in large-panel applications.

Since noise may be expressed by a square root function, the number of samples of an accumulator necessary to obtain desired signal resolution may be $2^{(2\times N)}$, where N is the desired resolution. In embodiments of the invention, since two or more driving lines are simultaneously driven, it is possible to decrease the time for driving the panel and to sufficiently and/or adequately ensure the processing time of the digital signal processor 320. Since the processing time is sufficient and/or adequate, a larger number of samples may be processed, and thus, accuracy of the touch sensor may be improved.

Figure 7:
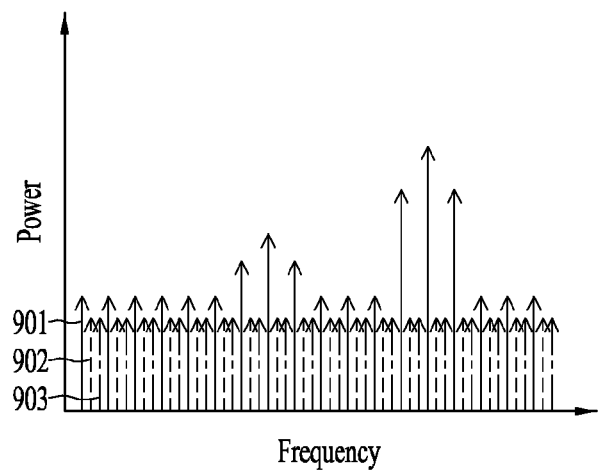
FIG. 7 is a diagram showing an exemplary power spectrum in a frequency domain of a modulated driving signal.

FIG. 7 is a diagram showing a power spectrum in the frequency domain of a modulated driving signal. Although two driving lines are simultaneously driven in FIG. 7, embodiments are not limited thereto.

Referring to FIG. 7, it can be seen that the modulated driving signals (e.g., Vdm1 and Vdm2) are transformed into spread spectrum signals having a relatively low power density per frequency unit (e.g., Hz). 901 denotes the spectrum of a noise signal flowing into the first sensing line Y1, 902 denotes the spectrum of the modulated second driving signal Vdm2, and 903 denotes the spectrum of the modulated first driving signal Vdm1.

Figure 8:
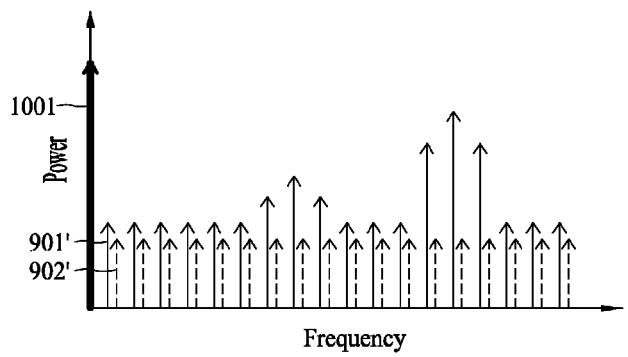
FIG. 8 is a diagram showing an exemplary power spectrum in a frequency domain of demodulated signals generated by an exemplary demodulator unit.
Figure 8:
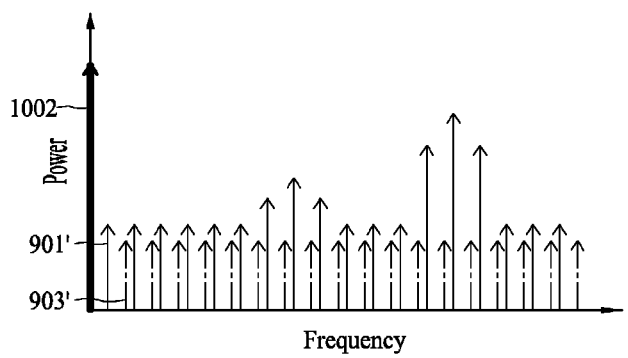

FIG. 8 is a diagram showing a power spectrum in the frequency domain of the demodulated signals (e.g., DVb1 and DVb2) generated by the demodulator unit 530. FIG. 8(a) shows the spectrum of the first demodulated signal (e.g., Dvb1) corresponding to a first modulated signal (e.g., Vdm1), and FIG. 8(b) shows the spectrum of the second demodulated signal (e.g., Dvb2) corresponding to a second modulated signal (e.g., Vdm2).

Referring to FIG. 8, in the first demodulated signal (e.g., Dvb1) corresponding to the first modulated signal (e.g., Vdm1), a spectrum part or component 1001 corresponding to the first driving signal (e.g., Vd1) is present in a low frequency band (e.g., a region in which the frequency is 0). In contrast, a part or component 901' corresponding to environmental noise and a spectrum part or component 903' corresponding to the second driving signal (e.g., Vd2) may be distributed or spread over the frequency band employed.

In addition, in the second demodulated signal (e.g., Dvb2) corresponding to the second modulated signal (e.g., Vdm2), a spectrum part or component 1002 corresponding to the second driving signal (e.g., Vd2) is present in a low frequency band (e.g., a region in which the frequency is 0). In contrast, a part or component 901' corresponding to environmental noise and a spectrum part or component 902' corresponding to the first driving signal (e.g., V1) may be distributed or spread over the frequency band employed.

Figure 9:
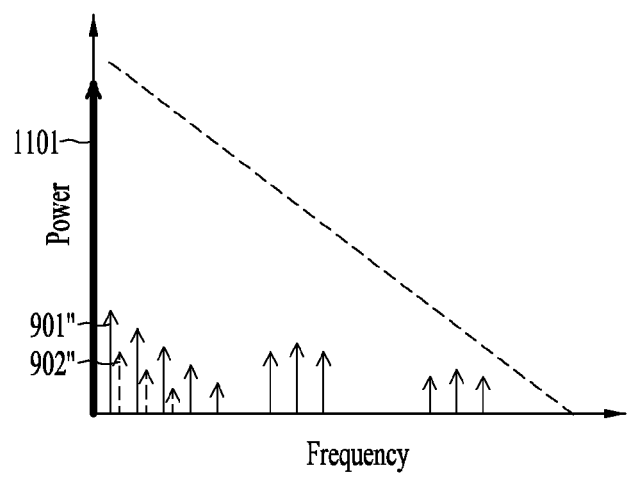
FIG. 9 is a diagram showing an exemplary power spectrum in a frequency domain of integrated signals generated by an exemplary integrator unit.
Figure 9:
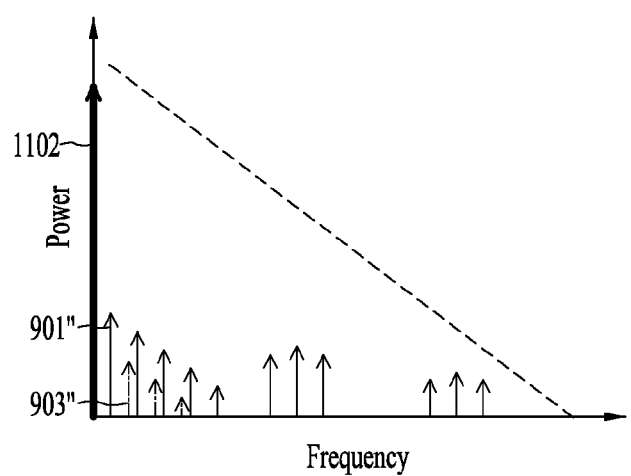

FIG. 9 is a diagram showing a power spectrum in a frequency domain of the integrated signals (e.g., VI1 and VI2) generated by an integrator unit 540. FIG. 9(a) shows the spectrum of the first integrated signal (e.g., VI1), and FIG. 9(b) shows the spectrum of the second integrated signal (e.g., VI2).

Referring to FIG. 9, the high frequency bands of the demodulated signals (e.g., Dvb1 and Dvb2) are eliminated by the integrator unit 540, which eliminates the influence of noise due to the peripheral environment of the touch sensor 100 and/or interference or influence between the simultaneously driven driving lines.

For example, a spectrum part or component 1101 corresponding to the first driving signal Vd1 in the first integrated signal VI1 may be maintained. In contrast, in the spectrum of the noise and the second driving signal Vd2, the part(s) or components in the high frequency band are eliminated, and only the parts or components 901" and 902" in the low frequency band remain.

In another example, a spectrum part or component 1102 corresponding to the second driving signal Vd2 in the second integrated signal VI2 may be maintained. In contrast, in the spectrum of the noise and the first driving signal Vd1, the part(s) or components in the high frequency band are eliminated, and only the parts or components 901" and 902" in the low frequency band remain.

Figure 6:
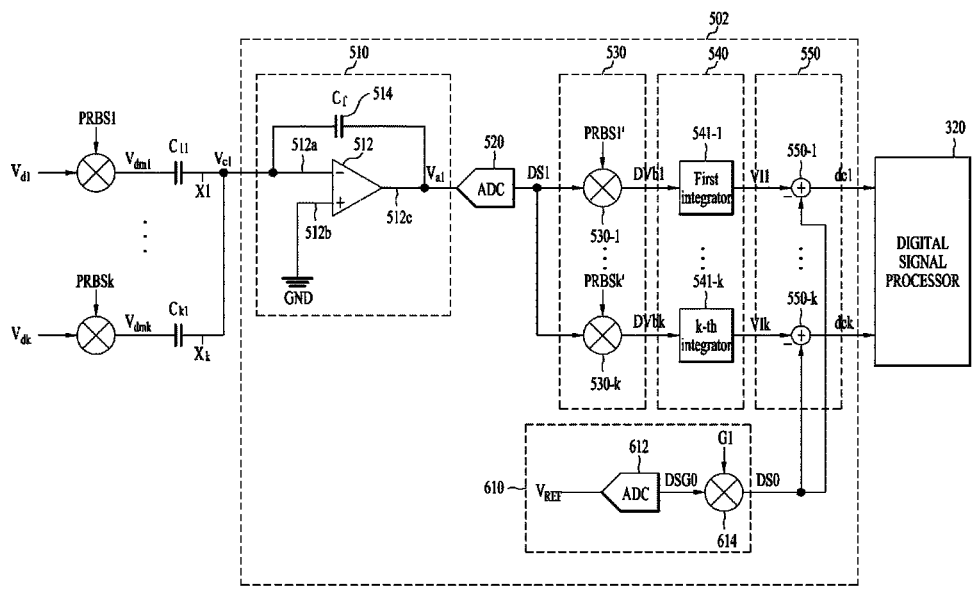
FIG. 6 is a diagram showing another exemplary embodiment of the first sensing circuit shown in FIG. 3.

FIG. 6 shows another embodiment 502 of the first sensing circuit 310-1 shown in FIG. 3. The same reference numerals as FIG. 5 indicate the same components, and the description of these same components will be brief or omitted.

Referring to FIG. 6, the first sensing circuit 502 according to another embodiment amplifies a signal Vc1 from the first sensing line Y1, and converts the analog amplified signal Va1 to a digital signal DS1. The first sensing circuit 502 generates demodulated signals DVb1 to DVbk (k being a natural number, 1<k<n) corresponding to the simultaneously driven driving lines X1 to Xkm (k being a natural number, 1<k<n) using the direct sequence spread spectrum technique or scheme, integrates the demodulated signals DVb1 to DVbk (k being a natural number, 1<k<n), generates integrated signals VI1 to VIk (k being a natural number, 1<k<n) in accordance with the integration operation, calculates a difference between each of the integrated signals VI1 to VIk (k being a natural number, 1<k<n) and a reference digital signal DS0, and outputs digital signals dc1 to dck (k being a natural number, 1<k<n) in accordance with the calculation.

The reference digital signal DS0 may be generated by converting an analog reference voltage VREF to a digital signal DSG0, and multiplying the digital signal DSG0 by a reference gain G1. Here, the reference voltage VREF may be a signal for simultaneously driving two or more driving lines (e.g., Vd1 to Vdk=VREF; alternatively, VREF=Vd1, Vd2, . . . Vdk).

The reference gain G1 may be the gain of the amplifier unit 510 of one sensing unit of the touch panel 10 when the touch panel 10 is not touched. For example, when the touch panel 10 is not touched, the capacitances C11 to Cnm of the sensing nodes P11 to Pnm may be identical to each other. For example, the reference gain G1 may be C11/Cf, and C11 may be the capacitance of the node capacitor C11 when the touch panel is not touched.

The first sensing circuit 502 may include an amplifier unit 510, an analog/digital converter unit 520, a demodulator unit 530, an integrator unit 540 and a first calculator unit 550.

The first calculator unit 550 may include a plurality of first calculators 550-1 to 550-$k$ ($k$ being a natural number, 1<$k$<n). Each of the plurality of first calculators 550-1 to 550-$k$ ($k$ being a natural number, 1<$k$<n) may calculate a difference between any one of the plurality of integrated signals VI1 to VIk ($k$ being a natural number, 1<$k$<n) and the reference digital signal DS0 and output digital signals dc1 to dck ($k$ being a natural number, 1<$k$<n) in accordance with the calculation.

The first sensing circuit 502 may further include a reference digital signal generator 610 configured to generating the reference digital signal DS0.

The reference digital signal generator 610 may include an analog/digital converter 612 configured to convert the analog reference voltage VREF and output the digital signal DSG0 and a second calculator unit 614 configured to multiply the digital signal DSG0 by the reference gain G1 and output the reference digital signal DS0 in accordance with the result of the multiplication operation.

Since the embodiment shown in FIG. 6 processes the digital signals dc1 to dck ($k$ being a natural number, 1<$k$<n) corresponding to a change in the mutual capacitance of the node capacitor(s) in accordance with touching the touch panel 10, the digital signal processing speed can be improved.

Since embodiments of the invention use a multi-line driving method for simultaneously driving two or more driving lines, it is possible to improve the response time of the digital signal processor 320, to ensure an accumulation calculation time necessary or desirable for noise filtering, to improve noise cancellation performance, and to improve accuracy.

Since embodiments of the invention use modulated driving signals Vdm1 to Vdmk which are not correlated with or adversely affected by environmental noise, it is possible to improve noise immunity.

In embodiments of the invention, the absolute value of mutual capacitance may be measured, and the properties of the touch panel 10 may be profiled in advance, such that digital calibration of the mutual capacitance of the sensing nodes is possible. In addition, failures such as short-circuits of the sensing lines of the touch panel may be detected.

According to embodiments of the invention, it is possible to improve noise immunity and accuracy.

Features, structures, effects, and the like as described above in the embodiments are included in at least one embodiment of the present invention and should not be limited to only one embodiment. In addition, the features, structures, effects, and the like described in the respective embodiments may be modified or combined with other embodiments by those skilled in the art. Accordingly, contents related to such combinations and modifications should be construed as within the scope of the present invention.

What is claimed is:

1. A touch sensor comprising:
   a touch panel including driving lines and sensing lines and having node capacitors between neighboring driving lines and sensing lines;
   a driving unit configured to modulate driving signals using a direct sequence spread spectrum technique or scheme and simultaneously drive two or more of the driving lines using the modulated driving signals, wherein the driving unit multiplies the driving signals by first pseudo-random binary sequences and outputs the modulated driving signals, a period of the first pseudo-random binary sequences is shorter than that of the driving signals, and a probability of each of the first pseudo-random binary sequences is 1 during a driving sample period of the two or more driving lines; and
   a sensing unit configured to demodulate the signals from the sensing lines using the direct sequence spread spectrum technique or scheme and generate demodulated signals.

2. The touch sensor according to claim 1, wherein the first pseudo-random binary sequences have different values.

3. The touch sensor according to claim 1, wherein:
   the sensing unit multiplies the signals received by the sensing lines by second pseudo-random binary sequences and generates the demodulated signals, and
   each of the second pseudo-random binary sequences is identical to any one of the first pseudo-random binary sequences.

4. The touch sensor according to claim 1, wherein the sensing unit includes:
   an amplifier unit configured to amplify the signals from the sensing lines and output amplified signals;
   an analog/digital converter unit configured to convert the amplified signals to digital signals; and
   a demodulator unit configured to demodulate the digital signals using the direct sequence spread spectrum technique or scheme and generate the demodulated signals.

5. The touch sensor according to claim 4, wherein the sensing unit further includes an integrator unit configured to integrate the demodulated signals and generate integrated signals.

6. The touch sensor according to claim 5, wherein:
   the sensing unit further includes a first calculator unit configured to calculate a difference between each of the integrated signals and a reference digital signal and generate digital output signals.

7. The touch sensor according to claim 6, further comprising a second calculator unit configured to multiply a digital voltage by a reference gain to generate the reference digital signal.

8. The touch sensor according to claim 7, wherein the digital voltage is a digital version of an analog reference voltage, and the reference gain is a gain of the amplifier unit when the touch panel is not touched.

9. The touch sensor according to claim 4, wherein:
   the demodulator unit includes a plurality of demodulators,
   each of the plurality of modulators multiplies each digital signal by any one of the second pseudo-random binary sequences and generates the demodulated signal, and
   each of the second pseudo-random binary sequences is identical to any one of the first pseudo-random binary sequences.

10. The touch sensor according to claim 4, wherein the sensing unit further includes a digital signal processor configured to detect a change in capacitances of the sensing nodes from the integrated signals.

11. The touch sensor according to claim 4, wherein the amplifier unit includes:
   an operational amplifier including a first input terminal connected to any one of the sensing lines, a second input terminal connected to a ground potential, and an output terminal configured to output an amplified signal, and
   a feedback capacitor connected between the output terminal and the first input terminal of the operational amplifier.

12. The touch sensor according to claim 1, wherein:
   the driving unit includes driving circuits configured to drive the driving lines, and
   each of the driving circuits includes:
      a random number generator configured to generate a first pseudo-random sequence; and
      a modulator configured to multiply a driving signal by the first pseudo-random binary sequence and output a modulated driving signal.

13. A touch sensor comprising:
   a touch panel including driving lines and sensing lines and having node capacitors between neighboring or overlapping driving lines and sensing lines, the driving lines including a plurality of groups, each of the plurality of groups including two or more driving lines;
   a driving unit configured to modulate driving signals using a direct sequence spread spectrum technique or scheme and simultaneously drive two or more driving lines in each of the plurality of groups using the modulated driving signals, wherein the driving unit multiplies each of the driving signals by any one of different first pseudo-random binary sequences to generate the modulated driving signals; and
   a sensing unit configured to generate amplified signals by amplifying the signals on or from the sensing lines, generate digital signals from the amplified signals, generate demodulated signals by demodulating the digital signals using the direct sequence spread spectrum technique or scheme, generate integrated signals by integrating the demodulated signals, calculate a difference between each of the integrated signals and a reference digital signal, and generate digital output signals, and
   a calculator unit configured to multiply a digital voltage by a reference gain to generate the reference digital signal.

14. The touch sensor according to claim 13, wherein the digital signal is a digital version of an analog reference voltage, and the reference gain is a gain of the amplified signal when the touch panel is not touched.

15. The touch sensor according to claim 13, wherein the driving unit sequentially drives the plurality of groups.

16. A touch sensor, comprising:
   a touch panel including driving lines and sensing lines and having node capacitors between neighboring driving lines and sensing lines;
   a driving unit configured to modulate driving signals using a direct sequence spread spectrum technique or scheme and simultaneously drive two or more of the driving lines using the modulated driving signals, wherein the driving unit multiplies the driving signals by first pseudo-random binary sequences and outputs the modulated driving signals; and
   a sensing unit configured to demodulate the signals from the sensing lines using the direct sequence spread spectrum technique or scheme and generate demodulated signals, wherein the sensing unit multiplies the signals received by the sensing lines by second pseudo-random binary sequences and generates the demodulated signals, and each of the second pseudo-random binary sequences is identical to any one of the first pseudo-random binary sequences.

* * * * *